(12) United States Patent
Khazin et al.

(10) Patent No.: US 10,416,955 B2
(45) Date of Patent: Sep. 17, 2019

(54) POWER REDUCTION THROUGH CLOCK MANAGEMENT

(71) Applicant: QUALCOMM Incorporated, San Diego, CA (US)

(72) Inventors: Alexander Khazin, Nesher (IL); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/725,813

(22) Filed: Oct. 5, 2017

(65) Prior Publication Data

US 2018/0032307 A1 Feb. 1, 2018

Related U.S. Application Data

(63) Continuation of application No. 14/731,499, filed on Jun. 5, 2015, now Pat. No. 9,841,940.

(51) Int. Cl.
*G06F 17/00* (2019.01)
*G06F 3/16* (2006.01)
(Continued)

(52) U.S. Cl.
CPC .............. *G06F 3/165* (2013.01); *G06F 1/08* (2013.01); *G06F 1/324* (2013.01);
(Continued)

(58) Field of Classification Search
CPC . G06F 3/165; G06F 1/08; G06F 1/324; G11B 27/3036; H04R 3/00; H04R 2460/03; Y02D 10/126
(Continued)

(56) References Cited

U.S. PATENT DOCUMENTS 7,400,359 B1 7/2008 Adams
2003/0026368 A1 2/2003 Subramoniam et al.
(Continued)

OTHER PUBLICATIONS

International Preliminary Report on Patentability for PCT/US2016/031411, dated Aug. 30, 2017, 21 pages.
(Continued)

*Primary Examiner* — Paul C McCord
(74) *Attorney, Agent, or Firm* — Withrow & Terranova, PLLC

(57) ABSTRACT

Power reduction through clock management techniques are disclosed. In one aspect, the clock management is applied to a clock signal on a SOUNDWIRE™ communication bus. In particular, a control system associated with a master device on the communication bus may evaluate frequency requirements of audio streams on the communication bus and select a lowest possible clock frequency that meets the frequency requirements. Lower clock frequencies result in fewer clock transitions and result in a net power saving relative to higher clock frequencies. In the event of a clock frequency change, the master device communicates the clock frequency that will be used prospectively to slave devices on the communication bus, and all devices transition to the new frequency at the same frame boundary. In addition to the power savings, exemplary aspects of the present disclosure do not impact an active audio stream.

19 Claims, 9 Drawing Sheets

(51) Int. Cl.
*G06F 1/08* (2006.01)
*G06F 1/324* (2019.01)
*H04R 3/00* (2006.01)
*G11B 27/30* (2006.01)

(52) U.S. Cl.
CPC ........... *G11B 27/3036* (2013.01); *H04R 3/00* (2013.01); *H04R 2460/03* (2013.01); *Y02D 10/126* (2018.01)

(58) Field of Classification Search
USPC .......................................................... 700/94
See application file for complete search history.

(56) References Cited

U.S. PATENT DOCUMENTS

| | | | |
|---|---|---|---|
| 2004/0037311 A1* | 2/2004 | Willes | H04B 3/54 370/465 |
| 2004/0062278 A1* | 4/2004 | Hadzic | H03L 7/085 370/503 |
| 2009/0024234 A1 | 1/2009 | Archibald | |
| 2012/0243560 A1* | 9/2012 | Pan | H04J 3/1605 370/517 |
| 2013/0129114 A1 | 5/2013 | Lesso | |
| 2013/0156044 A1 | 6/2013 | Gruber et al. | |
| 2013/0322462 A1 | 12/2013 | Poulsen | |
| 2014/0244884 A1 | 8/2014 | Segev et al. | |
| 2016/0210051 A1 | 7/2016 | Qutub et al. | |
| 2016/0357504 A1 | 12/2016 | Khazin | |

OTHER PUBLICATIONS

Author Unknown, "Audio Codec '97," Intel, Revision 2.3 Revision 1.0, Apr. 2002, 108 pages.
Author Unknown, "Audio, Low-Speed Data and Control," MIPI Appliance, 2014, 3 pages.
Backman, Juha et al., "SLIMbus™: An Audio, Data and Control Interface for Mobile Devices," AES 29th International Conference, Seoul, Korea, Sep. 2-4, 2006, 10 pages.
International Search Report and Written Opinion for PCT/US2016/031411, dated Aug. 11, 2016, 18 pages.
Second Written Opinion for PCT/US2016/031411, dated May 12, 2017, 8 pages.

* cited by examiner

POWER REDUCTION THROUGH CLOCK MANAGEMENT

PRIORITY CLAIM

The present application claims priority to and is a continuation of U.S. patent application Ser. No. 14/731,499, now U.S. Pat. No. 9,841,940, filed on Jun. 5, 2015 and entitled "POWER REDUCTION THROUGH CLOCK MANAGEMENT," the contents of which is incorporated herein by reference in its entirety.

BACKGROUND

I. Field of the Disclosure

The technology of the disclosure relates generally to managing power consumption on a communication bus and particularly on a SOUNDWIRE™ communication bus.

II. Background

Mobile phones have evolved from relatively simple devices that mimicked operation of a phone on the Public Switched Telephone Network (PSTN) to complex mobile computing devices that include substantial computing power capable of performing many computing functions as well as serving as multimedia platforms for audio and/or video capture and/or playback.

To assist in the handling of audio activity, such mobile computing devices may include multiple microphones and multiple speakers. Various techniques exist to facilitate communication between these audio components and an audio processor. Most such techniques contemplate an analog interface requiring a dedicated two-port wiring. The MIPI® Alliance initially published the Serial Low-power Inter-chip Media Bus (SLIMbus$^{SM}$) standard to harmonize communication between these audio components and the audio processor. However, SLIMbus has not seen widespread industry adoption, due in part to its complexity. In response to the low acceptance of SLIMbus, the Low Speed Multipoint Working Group (LML-WG) of MIPI is working on a new standard called SOUNDWIRE™, which is conceptually simpler than SLIMbus, and may receive wider industry adoption. SOUNDWIRE allows all devices to share a two-wire communication bus having a clock and data line. The devices share the data line through a time division multiplexing (TDM) frame structure to transport media streams.

Mobile computing devices typically run on a rechargeable battery. Consumer demand requires maximizing time between recharging the battery, and thus, there is substantial pressure to reduce power consumption within mobile computing devices. SOUNDWIRE, as proposed by MIPI, may not provide optimal power savings for mobile computing devices.

SUMMARY OF THE DISCLOSURE

Aspects disclosed in the detailed description include power reduction through clock management. In an exemplary aspect, the clock management is applied to a clock signal on a SOUNDWIRE™ communication bus. In particular, a control system associated with a master device on the communication bus may evaluate frequency requirements of audio streams on the communication bus and select a lowest possible clock frequency that meets the frequency requirements. Lower clock frequencies result in fewer clock transitions, which results in a net power saving relative to higher clock frequencies. In the event of a clock frequency change, the master device communicates the clock frequency that will be used prospectively to slave devices on the communication bus, and all devices transition to the new frequency at the same frame boundary. In addition to the power savings, exemplary aspects of the present disclosure do not impact an active audio stream. Further, low latency audio streams are supported as is the CLOCK STOP mechanism from the SOUNDWIRE standard.

Implementing exemplary aspects of the present disclosure causes the slave devices to receive clock signals that may have different frequencies. Some analog slave devices may function better with a constant internal clock. Thus, further exemplary aspects of the present disclosure provide an indication from the master device to the slave devices that a frequency shift is going to occur so that the slave devices may implement an appropriate frequency division circuit to maintain an internal constant clock rate.

In this regard in one aspect, a slave device is disclosed. The slave device comprises an audio component comprising an analog component. The slave device also comprises a communication bus interface configured to couple to a communication bus and receive a clock signal therefrom. The slave device also comprises a frequency divider configured to receive the clock signal from the communication bus interface. The slave device also comprises a control system operatively coupled to the frequency divider. The control system is configured to determine a frequency requirement for the analog component. The control system is also configured to instruct use of the frequency divider to divide the clock signal from the communication bus interface to meet the frequency requirement. The control system is also configured to arrange for the analog component to receive the divided clock signal.

In another aspect, a slave device is disclosed. The slave device comprises an audio component comprising an analog component. The slave device also comprises a means for coupling a slave device to a communication bus and receiving a clock signal therefrom. The slave device also comprises a means for frequency division configured to receive selectively the clock signal from a communication bus interface. The slave device also comprises a control system operatively coupled to the means for frequency division. The control system is configured to determine a frequency requirement for the analog component. The control system is also configured to instruct use of the means for frequency division to divide the clock signal from the means for coupling the slave device to the communication bus to meet the frequency requirement. The control system is also configured to arrange for the analog component to receive the divided clock signal.

In another aspect, a method for controlling a slave device is disclosed. The method comprises determining a frequency requirement for an analog component of a slave device. The method also comprises instructing use of a frequency divider to divide a clock signal from a communication bus interface to meet the frequency requirement. The method also comprises arranging for the analog component to receive the divided clock signal.

DETAILED DESCRIPTION

Figure 1:
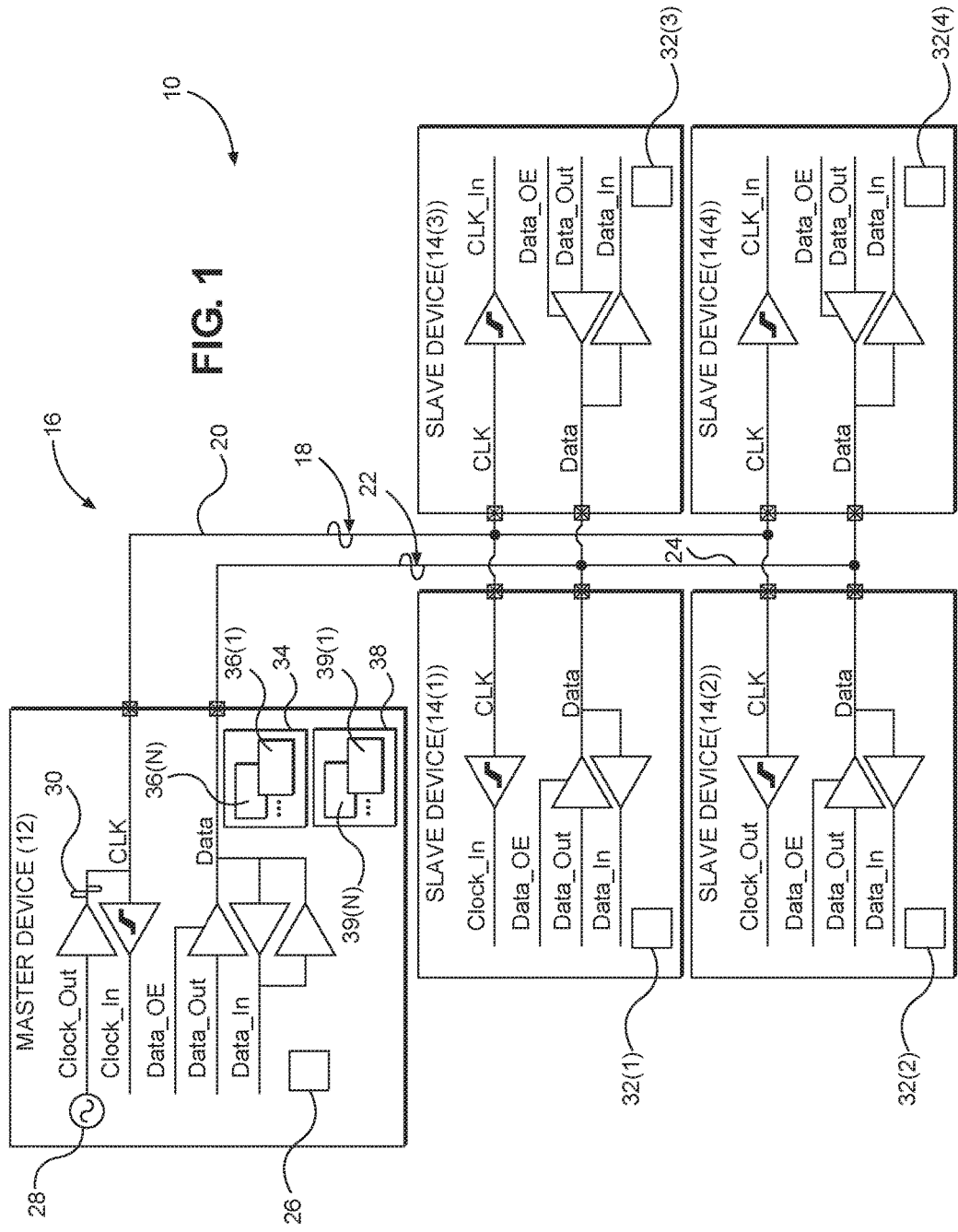
FIG. 1 is a block diagram of an exemplary audio system using a SOUNDWIRE™ compliant communication system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include power reduction through clock management. In an exemplary aspect, the clock management is applied to a clock signal on a SOUNDWIRE™ communication bus. In particular, a control system associated with a master device on the communication bus may evaluate frequency requirements of audio streams on the communication bus and select a lowest possible clock frequency that meets the frequency requirements. Lower clock frequencies result in fewer clock transitions which results in a net power saving relative to higher clock frequencies. In the event of a clock frequency change, the master device communicates the clock frequency that will be used prospectively to slave devices on the communication bus, and all devices transition to the new frequency at the same frame boundary. In addition to the power savings, exemplary aspects of the present disclosure do not impact an active audio stream. Further, low latency audio streams are supported as is the CLOCK STOP mechanism from the SOUNDWIRE standard.

Implementing exemplary aspects of the present disclosure causes the slave devices to receive clock signals that may have different frequencies. Some analog slave devices may function better with a constant internal clock. Thus, further exemplary aspects of the present disclosure provide an indication from the master device to the slave devices that a frequency shift is going to occur so that the slave devices may implement an appropriate frequency division circuit to maintain an internal constant clock rate.

Before addressing exemplary aspects of the present disclosure, a brief overview of an audio system 10 is provided with reference to FIG. 1. Exemplary aspects of the present disclosure begin below with reference to FIG. 2.

In this regard, FIG. 1 is a block diagram of an exemplary audio system 10 having one (1) master device 12 and four (4) slave devices 14(1)-14(4) communicatively coupled to a communication bus 16. In an exemplary aspect, the audio system 10 is a SOUNDWIRE system and the communication bus 16 may be a SOUNDWIRE communication bus. In an exemplary aspect, the slave devices 14(1)-14(4) may be microphones, speakers, or other audio devices. The master device 12 communicates with the slave devices 14(1)-14(4) using two (2) signals: a clock signal 18 (sometimes referred to herein as CLK) communicated over a common clock wire 20, and a data signal 22 (sometimes referred to herein as DATA) communicated over a common data wire 24 ("DATA 24") of the SOUNDWIRE communication bus 16. While only four slave devices 14(1)-14(4) are illustrated in FIG. 1, it should be appreciated that the SOUNDWIRE standard supports up to eleven (11) slave devices 14 per master device 12. The master device 12 may have a control system 26 associated therewith, which may be a hardware implemented processor with associated software stored in memory associated with the processor. In one exemplary aspect, the control system 26 is part of a system-on-a-chip (SoC) of the master device 12. In an alternate exemplary aspect, the control system 26 may be associated with a central processor for a computing device that includes the audio system 10. The master device 12 may also have a clock source 28 that generates a master clock (sometimes referred to as MCLK) signal 30. In further exemplary aspects, the slave devices 14(1)-14(4) each have a respective slave control system 32(1)-32(4). Notably, while this aspect illustrates various elements within the master device 12 and the slave devices 14(1)-14(4), other aspects may include alternative elements or configurations and achieve similar functionality. In this regard, the master device 12 may further include a register bank 34 (also referred to as Bank 0) with registers 36(1)-36(N) (illustrated in FIG. 4 in greater detail) and a register bank 38 (also referred to as Bank 1) with registers 39(1)-39(N) (also illustrated in FIG. 4 in greater detail).

As alluded to above, the clock signal 18 is generally over-engineered so that any audio stream may be properly supported on the audio system 10. That is, the clock signal 18 generally has a frequency that is sufficiently high that any audio stream may be supported. High frequency signals generally consume more power than low frequency signals and generate greater electromagnetic interference (EMI). In many instances, the audio streams on the communication bus 16 may not require such high frequency clock signals. However, the SOUNDWIRE standard does not support the ability to lower the frequency of the clock signal 18. Exemplary aspects of the present disclosure cure this deficiency, allowing for power savings and reduced EMI.

Figure 2:
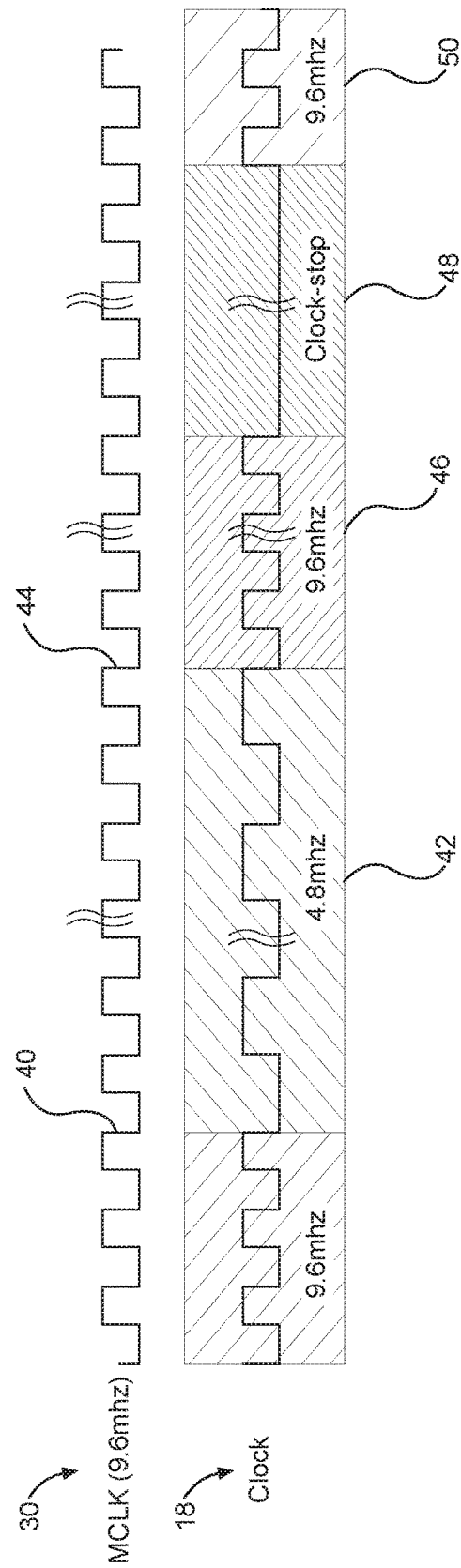
FIG. 2 is a diagram of a master clock signal compared to a frequency changing bus clock signal according to exemplary aspects of the present disclosure.

In this regard, exemplary aspects of the present disclosure allow the master device 12 to send a command to the slave devices 14(1)-14(4), wherein the command includes instructions on an upcoming frequency shift and a new sample interval. In this regard, FIG. 2 illustrates the MCLK 30 and the clock signal 18 of FIG. 1. The MCLK 30 may be a stable signal and may, in an exemplary aspect, be 9.6 MHz. When the control system 26 of FIG. 1 determines that a lower clock frequency may be used (as better explained below with reference to FIG. 5), the control system 26 causes the clock signal 18 to be modified to a lower frequency. Thus, after the command is generated to transition to a lower frequency clock signal 18, when the MCLK 30 reaches a last falling edge 40 of a frame, a new frame 42 begins, and the clock signal 18 begins at a lower frequency (as illustrated, 4.8 MHz, down from the initial 9.6 MHz). At some subsequent time, the control system 26 may determine that a higher frequency clock signal 18 is needed and a command is generated to transition to a higher frequency. Thus, when the MCLK 30 reaches a last falling edge 44 of the frame 42 (or other subsequent frame), the clock signal 18 begins at the higher frequency in frame 46. At some point, it may be possible to stop sending the clock signal 18 for one or more frames 48 and resume the clock signal 18 at some subsequent time at an appropriate frequency in a subsequent frame 50, wherein such stoppage of the clock signal 18 is defined by the SOUNDWIRE standard. While only two frequencies (e.g., 9.6 MHz and 4.8 MHz) are shown, it should be appreciated that more than two frequencies may be used. Likewise, other frequencies, such as 3.2 MHz, 6.4 MHz, 2.4 MHz, and 7.2 MHz, may be used.

Figure 3:
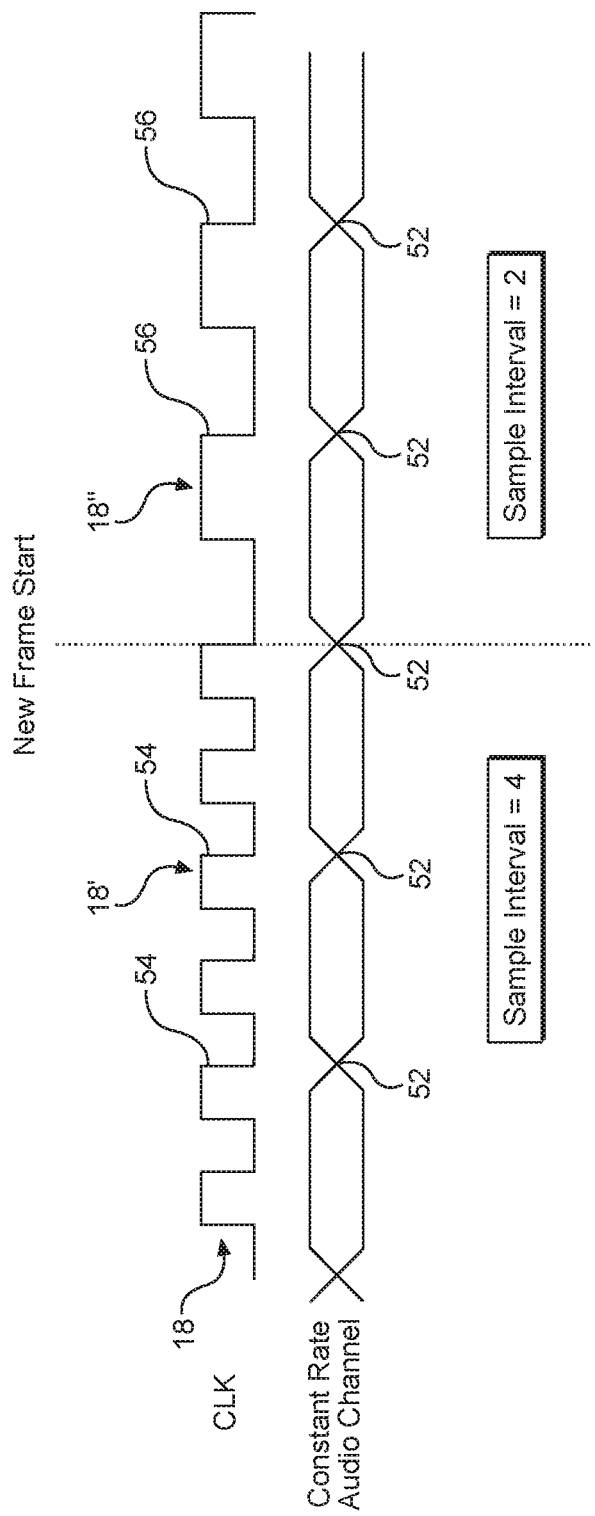
FIG. 3 is a diagram of a frequency changing bus clock relative to a constant rate audio channel with a variable sampling rate to maintain a constant rate audio channel.

When the frequency of the clock signal 18 changes, the sample interval of the slave devices 14(1)-14(4) changes as well so that a constant rate audio channel is maintained. FIG. 3 illustrates the clock signal 18 of FIG. 1 and, in particular, a high frequency clock signal 18' and a low frequency clock signal 18". When the high frequency clock signal 18' is received by the slave devices 14(1)-14(4), the sample interval is, as illustrated, four (4), but with the low frequency clock signal 18", the sample interval is, as illustrated, two (2). By changing the sample interval, samples 52 are still taken on falling edges 54 and 56 of the clock signal 18 and the constant rate audio channel is maintained.

Figure 4:
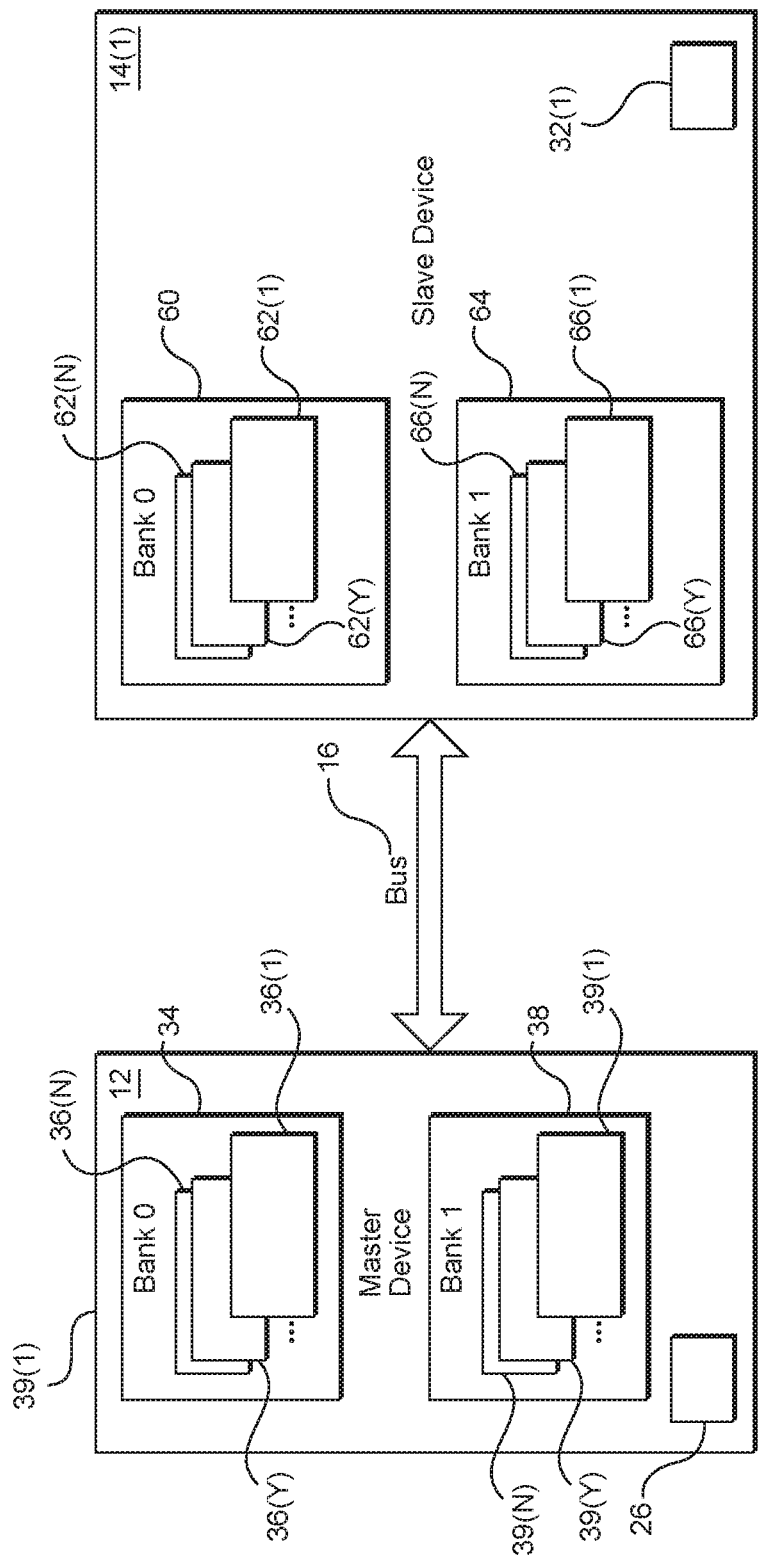
FIG. 4 is a simplified block diagram of a master and slave connected by a communication bus using the bank_switch command to facilitate clock frequency changes.

To assist in changing the frequency of the clock signal 18, exemplary aspects of the present disclosure take advantage of the bank_switch command that is part of the SOUNDWIRE standard. In this regard, each of the slave devices 14(1)-14(4) has one or more additional registers added to register banks. One such slave device 14(1) coupled to the master device 12 is illustrated in FIG. 4. In particular, the slave device 14(1) has a register bank 60 (also referred to as Bank 0) with registers 62(1)-62(N) and a register bank 64 (also referred to as Bank 1) with registers 66(1)-66(N). One register in each bank (e.g., register 62(Y) and register 66(Y)) is configured to hold information about the sample rate. To this end, the master device 12 sends an instruction to write the sample rate into the passive or inactive register (either the register 62(Y) or the register 66(Y), depending on which bank is active) at the same time that the bank_switch command is issued. As is understood, a bank_switch command causes the active and passive registers to invert such that a currently active register becomes the passive register and the currently passive register becomes the active register. Then at the next frame end, the slave device 14(1) switches active banks (e.g. from the register bank 60 to the register bank 64 or vice versa). With the bank_switch command, the slave device 14(1) uses the parameters of the newly activated register bank and operates accordingly (i.e., changes the sample interval to match the new frequency). It should be appreciated that the change can be performed while the audio streams are active and without disrupting the audio streams.

With continued reference to FIG. 4, the master device 12 may, as mentioned above, also include the register banks 34 and 38. One register in each of the register banks 34 and 38 (e.g., register 36(Y) and register 39(Y)) is configured to hold information about the clock bus frequency. The register 36(Y) and the register 39(Y) may sometimes be referred to as master clock generator bank registers.

Figure 5:
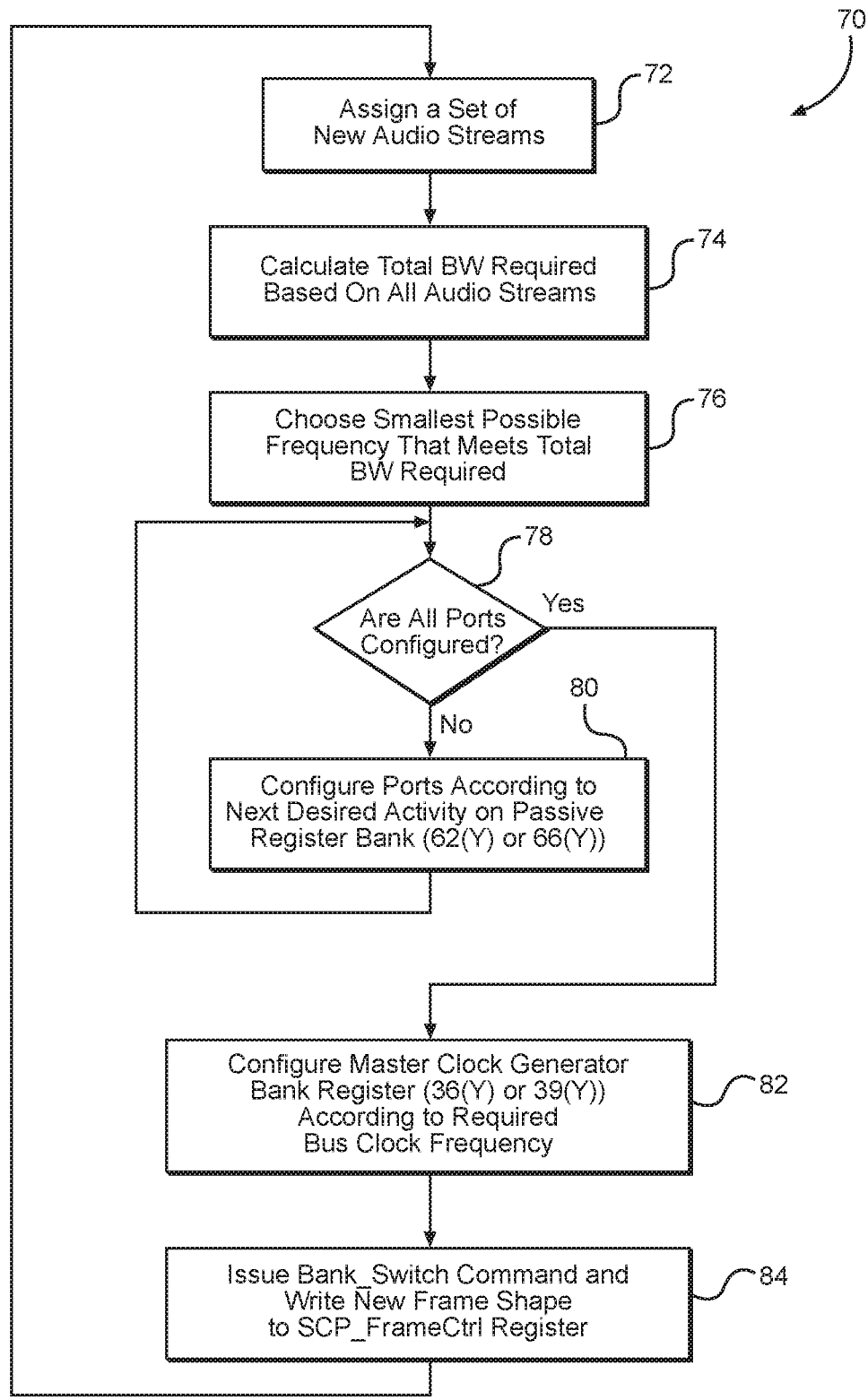
FIG. 5 is a flow chart of an exemplary method through which the clock frequency of the audio system of FIG. 1 may be changed.

A process 70 of changing clock frequencies is illustrated in FIG. 5. The process 70 begins with the assignment of a set of new audio streams (block 72). The control system 26 calculates the total bandwidth (BW) required on the communication bus 16 based on all the audio streams (block 74). This calculation is based on the number of ports, the port sample interval, the number of channels per port, and the channel word length. Such calculations are well understood. The control system 26 then chooses the smallest possible frequency that meets the total BW required (block 76). The control system 26 then determines if all the ports are configured (block 78). If the answer to block 78 is no, not all the ports are configured, the control system 26 configures the ports according to the next desired activity on the passive register bank (block 80). That is, the control system 26 sends a command to the slave devices 14(1)-14(4) to update values within the registers of the passive register bank (either the register bank 60 or the register bank 64). In particular, the new sample interval is written to the passive register (either the register 62(Y) or the register 66(Y)). The process 70 returns to block 78. Once the answer to block 78 is yes, all the ports are configured, the control system 26 configures the master clock generator bank register (e.g., the register 36(Y) or the register 39(Y)) according to the required bus clock frequency (block 82). The control system 26 then issues the bank_switch command and writes a new frame shape to the SCP_FrameCtrl register (not shown) (block 84). This command changes the bus frequency along with the frame shape and audio streams assignment. In addition, any offset changes are updated in the active bank register of the slave devices 14(1)-14(4).

Figure 6:
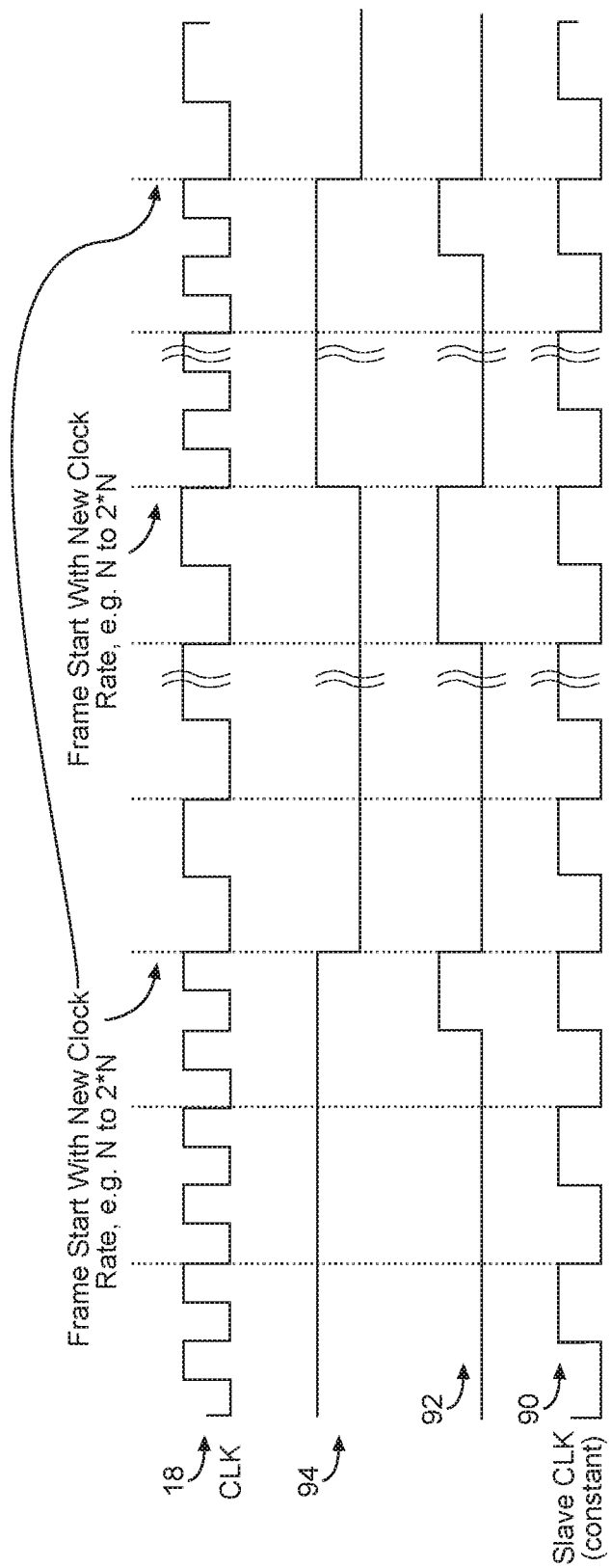
FIG. 6 is a diagram of the slave clock relative to the frequency changing bus clock.

One side effect of changing the frequency of the clock signal 18 is that it will change the frequency of the clocks inside the slave devices 14(1)-14(4). Unfortunately, some analog audio components, such as speakers or microphones, need a constant clock rate to process the audio stream without signal degradation. Exemplary aspects of the present disclosure provide the ability to maintain a constant clock signal inside the slave devices 14(1)-14(4). In this regard, FIG. 6 illustrates a slave clock signal 90 relative to a last bit of frame signal 92, a bank switch indication 94 and the clock signal 18. As is illustrated, the slave clock signal 90 remains constant, even though the clock signal 18 varies.

Figure 7:
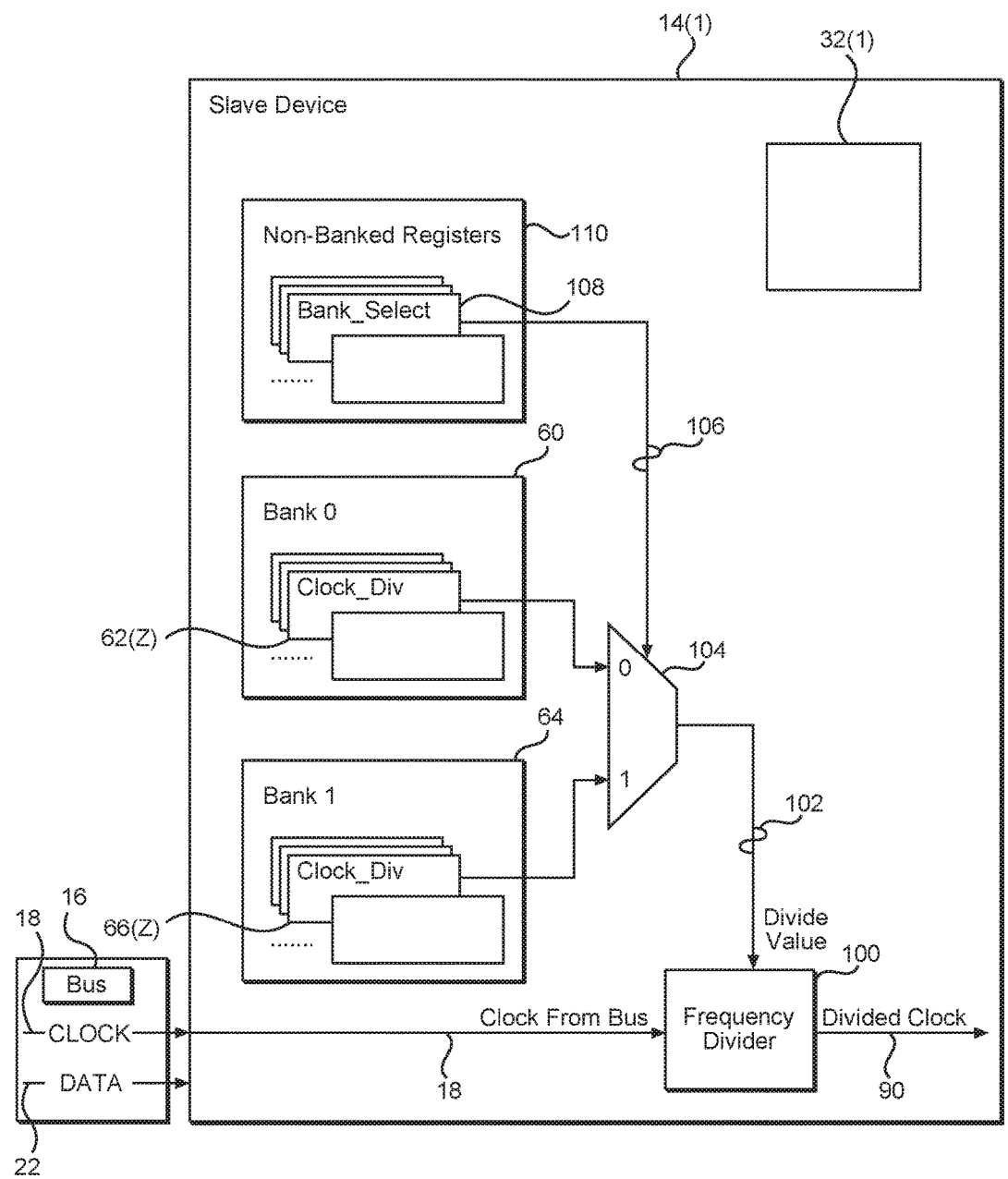
FIG. 7 is a block diagram of an exemplary aspect of frequency divider circuitry that enables the slave clock signal of FIG. 6.

To provide the constant slave clock signal 90, exemplary aspects of the present disclosure provide frequency divider circuitry in the slave devices 14(1)-14(4) as better illustrated in FIG. 7. In this regard, FIG. 7 illustrates the slave device 14(1) of FIG. 4 with a frequency divider 100 that receives the clock signal 18 from the communication bus 16 and divides the clock signal 18 to output a divided clock signal that is the constant slave clock signal 90. The frequency divider 100 is provided a divide value signal 102 from the active bank (either the register bank 60 or the register bank 64) through a multiplexer 104. In particular, the multiplexer 104 selects a clock division register 62(Z) or 66(Z) (also referred to in Figures as Clock_Div) and outputs the value therein to the frequency divider 100. The multiplexer 104 is controlled by a bank select signal 106 from a bank select register 108 within non-banked registers 110. When a bank_switch command is received from the control system 26 of the master device 12, the value in the bank select register 108 changes and the multiplexer 104 uses the value from the other of the register bank 60 or the register bank 64. While described as the frequency divider 100, it should be appreciated that the division is on the clock signal 18, and thus, the frequency divider 100 may also be referred to as a clock divider.

By keeping the constant slave clock signal 90 constant, any frequency requirements of the analog components (e.g., microphones and speakers) of the slave device 14(1) are maintained. Maintaining the frequency requirement results in better quality audio input and output, which results in a better user experience.

Figure 8:
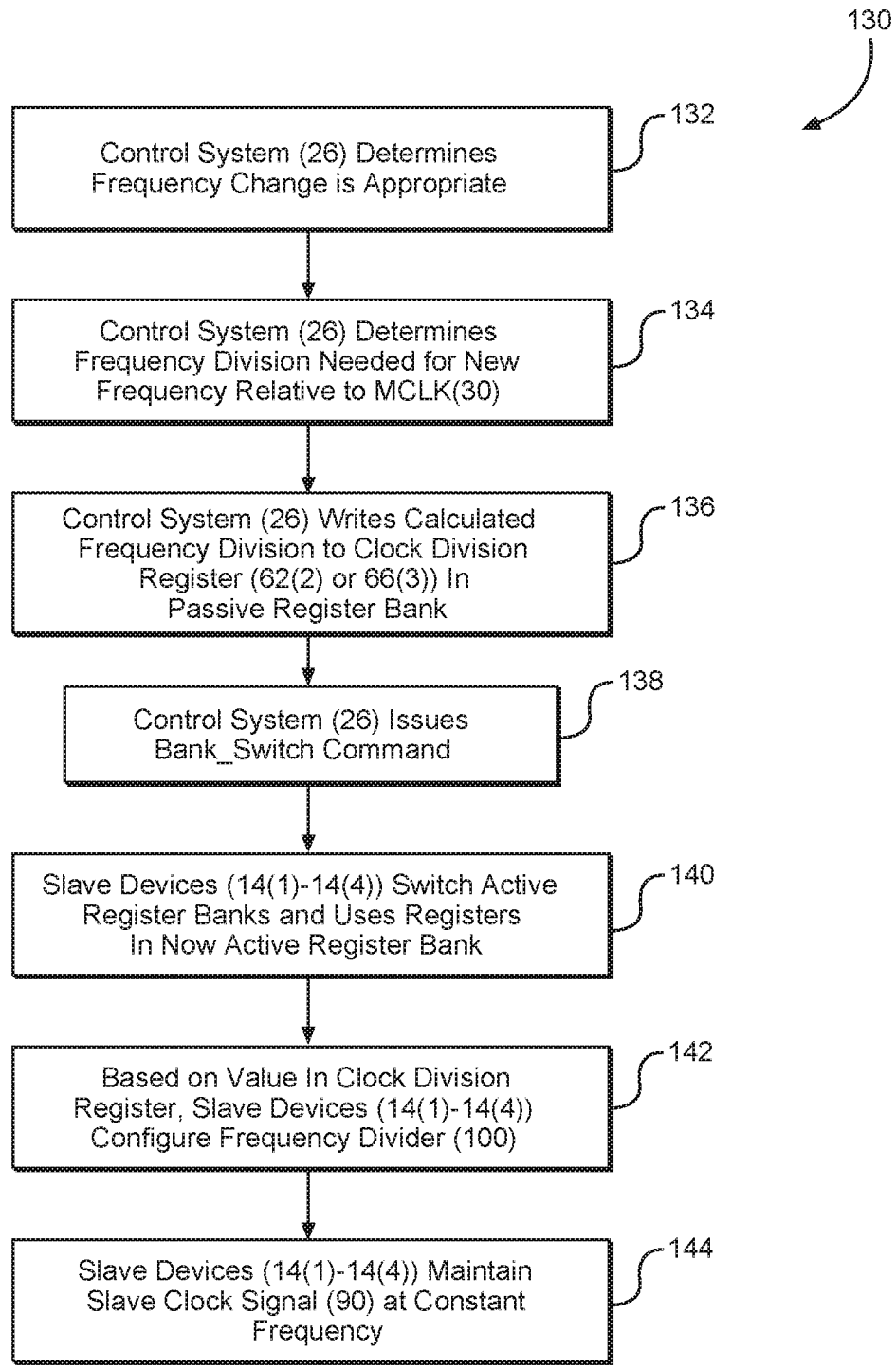
FIG. 8 is a flow chart of an exemplary method through which the slave may maintain a constant internal clock signal.

FIG. 8 illustrates a process 130 of updating the registers in the slave devices 14(1)-14(4) and the frequency division that allows the slave clock signal 90 to remain constant. The process 130 begins with the control system 26 determining that a frequency change is appropriate (block 132). The control system 26 then determines the frequency division needed at the slave devices 14(1)-14(4) for the new frequency relative to the MCLK 30 (block 134). The control system 26 writes the calculated frequency division to the clock division (Clock_Div) register 62(Z) or 66(Z) in the passive register bank of the slave devices 14(1)-14(4) (block 136). The control system 26 then issues the bank_switch command (block 138).

With continued reference to FIG. 8, the slave devices 14(1)-14(4) switch active register banks and the registers in the now active register bank (block 140) are available for use. Based on the value in the clock division register 62(Z) or 66(Z), the slave devices 14(1)-14(4) configure the frequency divider 100 (block 142). The slave devices 14(1)-14(4) maintain the slave clock signal 90 at a constant frequency (block 144) such that the audio stream from the analog components is not affected by the frequency change of the clock signal 18.

Note that the process 130 contemplates the calculation to determine the appropriate frequency division being performed by the control system 26 and instructions sent to the slave devices 14(1)-14(4). However, another exemplary aspect of the present disclosure contemplates that the master device 12 only sends information relating to the new frequency to the slave devices 14(1)-14(4) and allows the slave control systems 32(1)-32(4) to perform the calculation to determine the appropriate frequency division.

The power reduction through clock management techniques according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
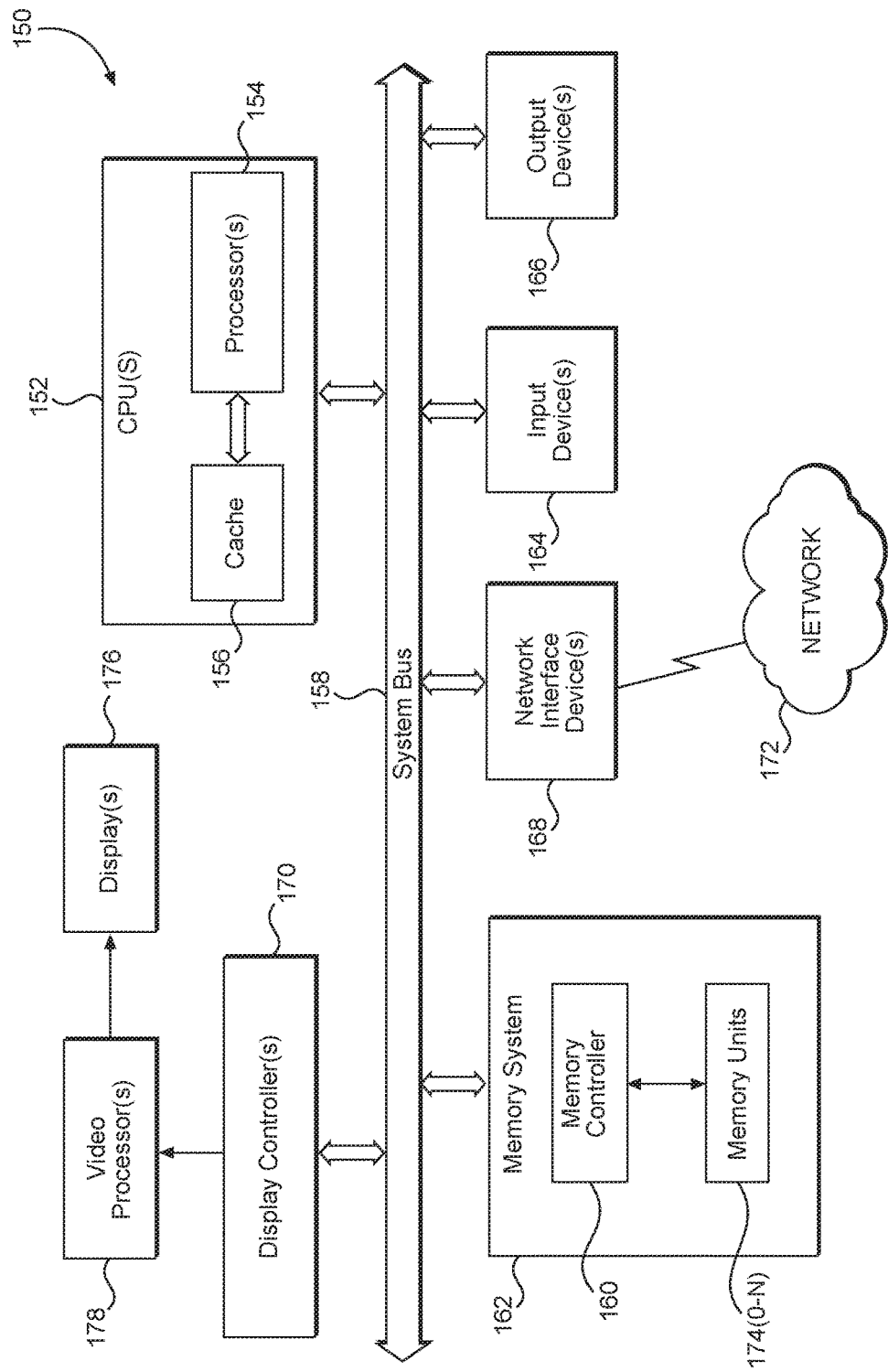
FIG. 9 is a block diagram of an exemplary processor-based system that can include the audio system of FIG. 1.

In this regard, FIG. 9 illustrates an example of an exemplary processor-based system 150 that can employ the power reduction through clock management techniques illustrated in FIGS. 1-8. In this example, the processor-based system 150 includes one or more central processing units (CPUs) 152, each including one or more processors 154. The CPU(s) 152 may have cache memory 156 coupled to the processor(s) 154 for rapid access to temporarily stored data. The CPU(s) 152 is coupled to a system bus 158 and can intercouple master and slave devices included in the processor-based system 150. As is well known, the CPU(s) 152 communicates with these other devices by exchanging address, control, and data information over the system bus 158. For example, the CPU(s) 152 can communicate bus transaction requests to a memory controller 160 as an example of a slave device. Although not illustrated in FIG. 9, multiple system buses 158 could be provided.

Other master and slave devices can be connected to the system bus 158. As illustrated in FIG. 9, these devices can include a memory system 162, one or more input devices 164, one or more output devices 166, one or more network interface devices 168, and one or more display controllers 170, as examples. The input device(s) 164 can include any type of input device, including, but not limited to, input keys, switches, voice processors, etc. The output device(s) 166 can include any type of output device, including, but not limited to, audio, video, other visual indicators, etc. It should be appreciated that the audio elements of the input and/or output devices may be coupled through a separate audio communication bus such as the SOUNDWIRE communication bus 16 of FIG. 1. The network interface device(s) 168 can be any device configured to allow exchange of data to and from a network 172. The network 172 can be any type of network. The network interface device(s) 168 can be configured to support any type of communications protocol desired. The memory system 162 can include one or more memory units 174(0-N).

The CPU(s) 152 may also be configured to access the display controller(s) 170 over the system bus 158 to control information sent to one or more displays 176. The display controller(s) 170 sends information to the display(s) 176 to be displayed via one or more video processors 178, which process the information to be displayed into a format suitable for the display(s) 176. The display(s) 176 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A slave device, comprising:
   an audio component comprising an analog component;
   a slave communication bus interface configured to couple to a communication bus and receive a clock signal from a master;
   a frequency divider configured to receive the clock signal from the slave communication bus interface;
   a control system operatively coupled to the frequency divider, the control system configured to:
   determine a frequency requirement for the analog component;
   instruct use of the frequency divider to divide the clock signal from the slave communication bus interface to meet the frequency requirement; and
   arrange for the analog component to receive the divided clock signal; and
   a register bank comprising an active register bank and a passive register bank, wherein the passive register bank is configured to receive data from the slave communication bus interface and wherein the control system is further configured to make the passive register bank the active register bank and vice versa on receipt of a command.

2. The slave device of claim 1, wherein the control system is configured to determine the frequency requirement for the analog component by receiving an instruction from the master.

3. The slave device of claim 1, wherein the control system is configured to determine the frequency requirement for the analog component based on an instruction received from the master.

4. The slave device of claim 1, wherein the audio component is selected from the group consisting of: a microphone and a speaker.

5. The slave device of claim 1, wherein the passive register bank comprises a passive clock division register and the active register bank comprises an active clock division register.

6. The slave device of claim 5, further comprising a multiplexer coupled to the passive clock division register and the active clock division register, wherein the multiplexer is configured to provide information from the active clock division register to the frequency divider.

7. The slave device of claim 1 integrated into an integrated circuit (IC).

8. The slave device of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

9. The slave device of claim 1, wherein the control system is further configured to receive an indication from the slave communication bus interface that a frequency shift is going to occur in the clock signal.

10. The slave device of claim 9, wherein the control system is further configured to implement an appropriate frequency division to meet the frequency requirement after the frequency shift.

11. The slave device of claim 1, wherein the control system is further configured to store a sample rate into a register in the register bank.

12. The slave device of claim 11, wherein the register is a passive register in the passive register bank.

13. The slave device of claim 12, further comprising an active register in the active register bank having an active sample rate stored therein.

14. A slave device, comprising:
    an audio component comprising an analog component;
    a means for coupling the slave device to a communication bus and receiving a clock signal therefrom;
    a means for frequency division configured to receive the clock signal from the means for coupling;
    a control system operatively coupled to the means for frequency division, the control system configured to:
    determine a frequency requirement for the analog component;
    instruct use of the means for frequency division to divide the clock signal from the means for coupling to meet the frequency requirement; and
    arrange for the analog component to receive the divided clock signal; and
    a register bank comprising an active register bank and a passive register bank, wherein the passive register bank is configured to receive data from the means for coupling and wherein the control system is further configured to make the passive register bank the active register bank and vice versa on receipt of a command.

15. A method for controlling a slave device, the method comprising: determining a frequency requirement for an analog component of the slave device; instructing use of a frequency divider to divide a clock signal from a communication bus interface to meet the frequency requirement; arranging for the analog component to receive the divided clock signal; receiving data from the communication bus interface; and switching between an active register bank and a passive register bank, wherein the passive register bank is configured to receive the data from the communication bus interface.

16. The method of claim 15, wherein determining the frequency requirement for the analog component comprises receiving an instruction from a master device.

17. The method of claim 15, wherein determining the frequency requirement for the analog component comprises calculating at the slave device the frequency requirement based on an instruction received from a master.

18. The method of claim 15, further comprising storing a clock division value in a passive clock division register.

19. The method of claim 15, further comprising switching, using a multiplexer, between values stored in a passive clock division register and an active clock division register to control the frequency divider.

* * * * *